(No Model.)
L. & E. W. COOPER.
SPROCKET WHEEL.
No. 605,443. Patented June 7, 1898.
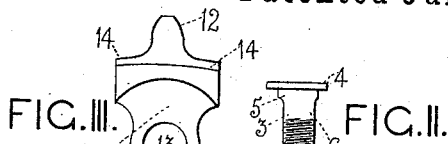
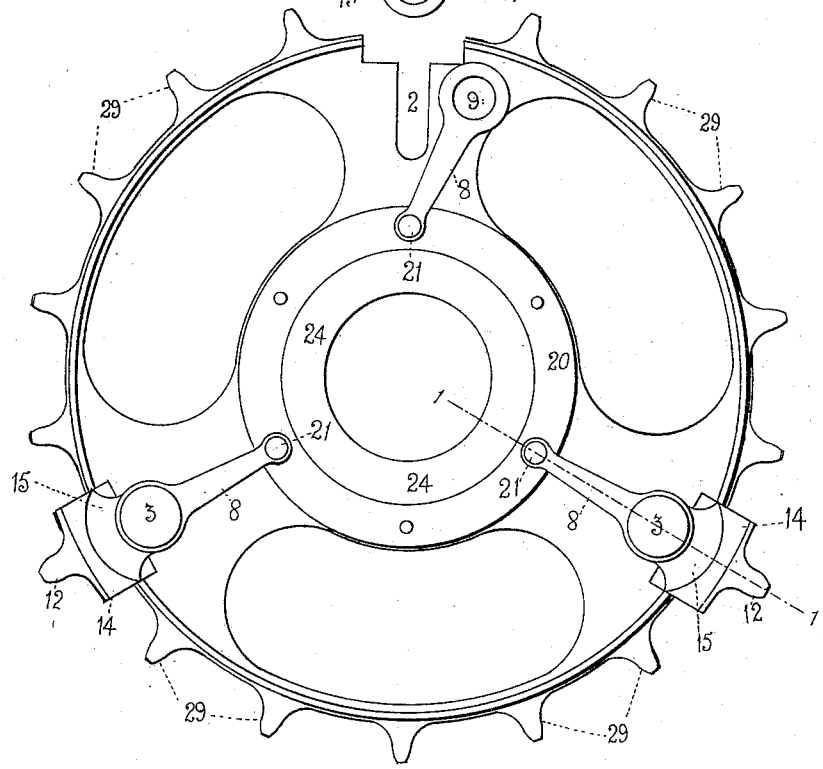
FIG. I.
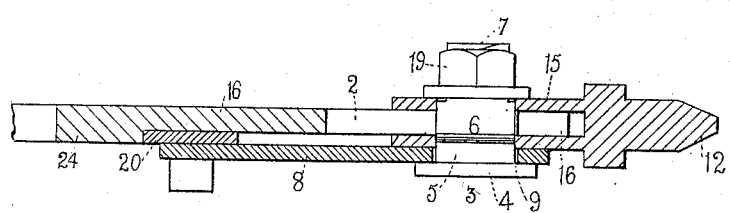
FIG. IV.
Witnesses
S. H. Bower
J. F. Wilson
Inventors
Louis Cooper
Edward Ward Cooper
per G. Douglas Leechman
Attorney.

UNITED STATES PATENT OFFICE.

LOUIS COOPER AND EDWARD WARD COOPER, OF COVENTRY, ENGLAND.

SPROCKET-WHEEL.

SPECIFICATION forming part of Letters Patent No. 605,443, dated June 7, 1898.

Application filed March 2, 1897. Serial No. 625,776. (No model.) Patented in England August 11, 1896, No. 17,706.

*To all whom it may concern:*

Be it known that we, LOUIS COOPER and EDWARD WARD COOPER, subjects of the Queen of Great Britain, residing at Coventry, in the county of Warwick, England, have invented a new and useful Construction of Sprocket-Wheels, (for which we have obtained a patent in Great Britain, No. 17,706, bearing date August 11, 1896,) of which the following is a specification.

Our invention relates to sprocket-wheels for chain-gearing, such as is commonly employed in velocipedes and other machinery.

The principal object of our invention is to reduce friction in chain-gearing.

Another object of our invention is to prevent the chain riding up on the teeth of the wheels, which is liable to cause accidents and injury.

Another object of our invention is to make the teeth, or some of them, detachable, so that they may be thoroughly hardened and may be replaced when worn out; and our invention consists, essentially, in making sprocket-wheels with two, or preferably three or more, of the teeth (hereinafter referred to as the "driving-teeth") adjustable radially, so that the pitch of the wheel may be adjusted to the pitch of the chain at first when the chain is new and subsequently as the pitch of the chain increases, owing to wear of the joints in the chain or otherwise; and our invention further consists in employing any or all of the remaining teeth as lateral guides only and not for the purpose of driving, thus reducing the number of frictional contacts between the chain and the wheel.

In the accompanying drawings, Figure I is a side view showing a velocipede sprocket-wheel constructed according to our invention and having one driving-tooth, bolt, and bar displaced. Fig. II shows a bolt in elevation. Fig. III shows a driving-tooth in elevation. Fig. IV is a transverse section on the line 1 1 in Fig. I, drawn to an enlarged scale.

Similar numerals refer to similar parts throughout the drawings.

We construct our improved sprocket-wheel with, say, three equidistant or approximately equidistant T-shaped radial slots 2, the center lines of such slots taking the place of the center lines of three equidistant or correspondingly approximately equidistant teeth in a sprocket-wheel of ordinary construction. In each slot 2 a bolt 3 is adapted to slide, which bolt is also adapted to carry a driving-tooth 12. The bolt has a flanged head 4. Its shank is of circular form next the head. Adjacent to this part there are two diametrically opposite flats and the remainder is screw-threaded. The unthreaded parts 5 6 of the shank are adapted to fit the hole 13 in the tooth 12 and, say, the hole 9 in the bar 8. The flattened part 6 is adapted to fit the narrow portion of the slot 2, so that the bolt can slide lengthwise, but not rotate therein. The threaded part 7 is adapted to receive a lock-nut 19. The driving-tooth 12 is provided with lateral projections 14, adapted to fit and support the part of the chain with which it at any time engages. The projections 14 are adapted also to fit and slide in the wide portion of the T-slot 2 in the wheel. The tooth 12 is further provided with a lug 15, projecting toward the center of the wheel. The lug 15 is bored transversely with the hole 13, before referred to. It is also slotted in the plane of the wheel, so that it may sit astride the web 16 of the wheel and bear on the parts of the web adjacent to the slot 2. All the slots 2, bolts 3, and driving-teeth 12 are facsimiles of each other, respectively. Thus it will be seen that when the said bolts and driving-teeth are mounted in position on the wheel the said teeth are capable of a radial movement in the plane of the wheel.

It is important that the driving-teeth should all be adjusted equally, and to insure this we employ the method shown in Figs. I to IV. We provide the wheel with a concentric boss or projection 24, and around this we place a closely-fitting ring 20. At three equidistant points 21 on the ring 20 we pivot the inner ends of three similar bars 8. The length of the bars is suitably greater than the difference between the radii of the pitch-circle of the points 21 and the pitch-circle of the bolts 3 when the driving-teeth are in their nearest position to the center of the wheel, so that if the ring 20 be rotated so as to bring the bars 8 more nearly into a radial position relatively to the wheel all three driving-teeth will be moved outward radially and equally from the center of the wheel, thus maintaining them in pitch with each other, whatever that pitch may be. The teeth may be retracted by rotating the ring 20 in the reverse direction. The pivot-pins at the points 21 may be left somewhat long to afford a grip for a suitable spanner by which the ring may be rotated. The movable parts are locked in position by tightening the nuts 19 on the bolts 3.

When the circumference of the sprocket-wheel is so related to the pitch of the chain that the driving-teeth must be arranged otherwise than exactly equidistantly, the parts of the actuating device also are arranged otherwise than equidistantly and in such relative positions as correspond with the positions of the driving-teeth.

The driving-teeth being detachable may be made of material suitable for thorough hardening. When worn out, they may be readily replaced. By adjusting the driving-teeth to the pitch of the chain the scraping action which is set up between the links of a stretched chain and the faces of the teeth of an ordinary sprocket-wheel is avoided, and also is the liability of such a chain to mount on the teeth of the wheels.

By reducing the number of driving-teeth to the lowest or almost the lowest number necessary to prevent slip between the chain and the wheels the number or quantity of frictional contacts between the links of the chain and the teeth of the wheel is correspondingly reduced. We prefer to retain some or all of the other teeth 29 and to make them of rather less width than the driving-teeth, so that they (29) will not touch the chain in ordinary running; but if the chain sways they will prevent its moving so far laterally on the wheel as to foul or mount the driving-teeth as they come round; but we make these other teeth 29 with their faces set back, so that they cannot engage with the links of the chain, so as to drive or be driven by the same.

We wish it to be understood that we do not confine ourselves to the precise details of construction herein described and illustated, but hold ourselves at liberty to make such variations and modifications as fairly fall within the scope of our invention.

We are aware that prior to our invention sprocket-wheels have been constructed in which all the teeth have been adjustable for pitch, and we do not broadly claim the same as our invention; but What we do claim as our invention, and desire to secure by Letters Patent, is—

1. In a sprocket-wheel, the combination of bolts adapted to move radially, nuts to lock the bolts, movable driving-teeth carried by the said bolts, links pivotally connected at their outer ends with the said bolts, a boss formed concentrically with the said wheel, a ring rotatably mounted on the said boss and pivotally connected with the inner ends of the said links, and guide-teeth situated between the driving-teeth, substantially as described and for the purpose set forth.

2. In a sprocket-wheel having driving-teeth adjustable radially to the pitch of the chain and guide-teeth situated between such driving-teeth, the combination with such driving-teeth of bolts to carry the said driving-teeth, nuts to screw on the bolts, links pivotally connected by their outer ends to the said bolts, a boss concentric with the wheel, and a ring rotatably mounted on the said boss and pivotally connected to the inner ends of the said links substantially as described and for the purpose set forth.

LOUIS COOPER.
EDWARD WARD COOPER.

Witnesses:
STANLEY HATTON BOWER,
THOMAS FLETCHER WILSON.